United States Patent [19]

Seiler

[11] Patent Number: 5,064,598

[45] Date of Patent: Nov. 12, 1991

[54] PROCESS AND APPARATUS FOR MANUFACTURING A PLEATED FILTER INSERT

[76] Inventor: Hanspeter Seiler, Wasserig 29, CH-4653 Obergosgen, Switzerland

[21] Appl. No.: 615,904

[22] Filed: Nov. 20, 1990

[30] Foreign Application Priority Data

Nov. 27, 1989 [CH] Switzerland ........................ 04237/89
Aug. 16, 1990 [CH] Switzerland ........................ 02665/90

[51] Int. Cl.[5] ........................ B29C 53/26; B29C 53/28

[52] U.S. Cl. .................................... 264/230; 264/287; 425/336; 425/343; 425/384; 425/396

[58] Field of Search .................... 264/286, 248, 342 R, 264/342 RE, 230, 287; 425/396, 343, 336, 384

[56] References Cited

U.S. PATENT DOCUMENTS

| | | | |
|---|---|---|---|
| 3,531,920 | 10/1970 | Hart . | |
| 3,792,952 | 2/1974 | Hamon | 425/336 |
| 3,922,129 | 11/1975 | McDonald | 425/336 |
| 4,666,394 | 5/1987 | Wakamiya et al. | 425/384 |
| 4,878,826 | 11/1989 | Wendt | 425/384 |

FOREIGN PATENT DOCUMENTS 2273657 1/1976 France .

*Primary Examiner*—Jan H. Silbaugh
*Assistant Examiner*—Merrick Dixon
*Attorney, Agent, or Firm*—Sandler, Greenblum & Bernstein

[57] ABSTRACT

A process and apparatus for the manufacture of a pleated filter insert made of a thermoplastic material. The pleat walls are maintained at a distance with the filter pleats open in the direction of outflow of the filter insert by elongated ribs made of the filter material itself. The tape-like filter material is gathered in a first process step. The elongated ribs are produced by means of tension-free, permanent shaping of the gathered filter material, heated to a temperature which is below the shrinking temperature and above the deformation temperature of the filter material, between the jaws of a shaping device. The intermediate areas of the filter material intended for the forming of pleat wall edges are heated by at least one heater jaw to a temperature which is between the deformation temperature and the melting temperature until the irregularities of the filter material in the intermediate area have been smoothed out. The filter insert, provided with elongated ribs in the filter pleat wall for maintaining a distance also maintains the original filtering properties in the pleat walls, has a smooth surface at the pleat wall edges, and has sufficient stability.

12 Claims, 4 Drawing Sheets

PROCESS AND APPARATUS FOR MANUFACTURING A PLEATED FILTER INSERT

BACKGROUND OF THE INVENTION

1. Field of the Invention

The present invention relates to a process and an apparatus for manufacturing a pleated filter insert, which is made of thermoplastic material. The filter material is to be placed between the inflow and outflow sides of a filter, and includes a plurality of elongated bulges or ribs in at least the filter pleats which are open in the direction of the outflow side of the filter. The ribs are shaped from the filter material itself and maintain the filter walls at a distance from each other.

2. Description of Background and Relevant Information

A process and apparatus of the type described above is disclosed in U.S. Pat. No. 3,531,920, wherein the material, which may be a thermoplastic material, is fed through a roller to a press. The press includes two heated cylinders, which are rotatable in opposite directions, and are provided with meshing raised portions and recesses intended for the shaping of ribs and recesses in the filter material. Between these two heated cylinders, the filter material is provided with the elongated ribs and recesses, which space the filter pleat walls apart, as well as with crosswise grooves which facilitate the shaping of pleat edges. In this process, the filter material is permanently shaped by pressing between the two heated cylinders. However, the structure of the filter material in the pressed area is also changed by the heated pressing. For this reason, the filter material which is permanently shaped by this process cannot retain its original filtering properties in areas which are important for filtering. Therefore, it is necessary to use a larger filter insert, which entails higher costs than would be required for a filter insert with totally usable filter walls, to obtain the same filter effect.

Another apparatus for manufacturing a pleated filter insert is described in French Patent No. 2,273,657. In this apparatus, a stretchable filter material is first provided with alternate convex and concave longitudinal grooves by changing the structure of the material through stretching of the filter material between two rollers. In a second step, the filter material is folded transverse to the longitudinal grooves in order to obtain pleated filter inserts. In order to be able to fold the filter material transverse to the longitudinal grooves, it is necessary to use a stretchable filter material. However, most filter materials used are not stretchable, or at least change the filtering properties of the filter material when stretched. For this reason, this apparatus is only usable in connection with particular stretchable filter materials. Furthermore, the pleat edges, which occur when pleating is transverse to the longitudinal grooves, have unwanted irregularities which, at a minimum, make cleaning of the filter insert harder.

SUMMARY OF THE INVENTION

It is an object of the present invention to provide a process and an apparatus for manufacturing a filter insert, which is made of thermoplastic material, and includes elongated ribs, at least in the filter pleat walls on the outflow side, which keep the walls spaced apart. The filtering properties of the filter material are maintained in the filter walls during manufacture in spite of the shaping of the filter material, and the completed filter insert has sufficient strength and smooth pleat edges, which facilitates cleaning of the filter, and provides economic advantages.

One object of the invention is attained by a first process step, in which the tape-like filter material, which is intended to produce at least one filter insert, is transported in the longitudinal direction, and is narrowed transverse to the longitudinal direction by the amount of material required for the elongated ribs. The material is gathered evenly across the entire width, so that the elongated ribs are produced by tension-free, permanent shaping of the gathered material, which is heated to a temperature which is below the shrinking temperature but above the deformation temperature of the filter material. The heating takes place between jaws of a shaping device, and the material is subsequently cooled below the deformation temperature of the filter material. The linear areas of the filter material, which are intended for the shaping of the pleat edges, are heated by at least one heater jaw to a temperature which is between the deformation temperature and the melting temperature until the irregularities caused by the elongated ribs and/or the gathering of the filter material are smoothed out. The material is subsequently cooled to a temperature below the deformation temperature.

This process permits the production of a filter insert from a thermoplastic material, whereby the pleat walls maintain the original filtering properties of the filter material in spite of the ribs, and where the pleat edges have smooth, easy to clean surfaces. Furthermore, because of their comparatively high stiffness, the thermally treated pleat edges ensure good stability of the filter insert. In the course of the thermal treatment by the heater jaws, the filter material is permanently drawn together at the line-shaped pleat edges and is narrower there than the untreated filter material by the amount of the material required for the elongated ribs. The pleat edges, which are shortened in this manner, maintain the shape of the elongated ribs, even during the highest operational flow and contamination of the medium to be filtered, and do not permit the filter insert to stretch. Furthermore, the filter inserts produced by this process are economically advantageous, because additional steps are not required, either for attaining sufficient stiffness of the filter insert or for maintaining the distance between the pleat walls of the filter pleats. The filtering properties of the filter insert are nevertheless ensured to the highest degree possible because of the fully effective pleat walls.

Prior to forwarding the gathered filter material to the jaws of the shaping device, it is possible to heat the material to a temperature which is below the shrinking temperature and above the deformation temperature, and subsequently to place it between the jaws of the shaping device. By this step it is possible to increase the passing speed of the filter material when using a pass-through method. Alternatively, the gathered filter material is first placed between first jaws of the shaping device, heated to a temperature which is below the shrinking temperature and above the deformation temperature, and then between second jaws which are cooled to below the deformation temperature. The filter material, which is provided in this way with longitudinal grooves at regular intervals in the line-shaped areas provided for the shaping of pleat edges, is then heated by at least one heater jaw to a temperature which is between the deformation temperature and the melting temperature, until the irregularities caused by the longitudinal grooves are smoothed out.

By the use of these process steps, it possible to prepare the filter material by means of the pass-through method in an economically advantageous manner for use in a filter with a pleated filter insert. In a single process step, it is possible to shape in a tension-free manner at least two successive pleat wall areas of the filter material for receiving the longitudinal ribs between the jaws of a press, which have been heated to a temperature which is below the shrinking temperature and above the deformation temperature of the filter material, as well as to heat each one of the free intermediate areas of the filter material, which are located between the individual pleat wall areas of the filter material, which are maintained in the press, to a temperature which is between the deformation temperature and the melting temperature until the irregularities in the filter material in the intermediate area are smoothed out. Several pleat wall areas, as well as the areas in-between and intended for the pleat edges, are thus permanently shaped in the described press in one operation.

The longitudinal orientation of the elongated ribs, which are located between the jaws of the press with respect to the longitudinal orientation of the pleat walls may be set at an angle of 45° to 90°. By means of an orientation at 90°, the elongated ribs in the filter pleats are at least spaced at a single thickness of a rib from the pleat walls and, with other angle values, the walls are spaced at double the thickness because of crossing of the ribs. The crossing of elongated ribs maintains the distance between the pleat walls, but only reduces the effective filter area by the size of the spot-like contact areas of the crossed ribs.

During the main process step, the successive pleat wall areas can be maintained in the press at an acute angle with respect to each other, and a pleat edge can be shaped between each free intermediate area, which is located between the individual pleat wall areas maintained in the press by heating to a temperature, which is between the deformation temperature and the melting temperature. This step makes it possible to produce the pleated filter insert with ribs in the pleat walls, and with pleat edges shaped between the pleat walls in a single process step. The line-like areas intended for the shaping of pleat wall edges are advantageously heated by at least one heater jaw to a temperature which is between the shrinking temperature and the melting temperature until the irregularities caused by the elongated ribs and/or by gathering the filter material are smoothed out. Because of the execution of this step, a particularly stable line-shaped area is achieved at the pleat wall edges of the filter insert, and therefore the filter insert can maintain its stability, even under extraordinary conditions.

An apparatus for executing the process includes a plurality of rounded protrusions, which are distributed transversely to the longitudinal extension of the filter material and are interlocked in the manner of a comb, and are provided for the gathering of the filter material. The shaping device includes at least one heating device and at least two jaws executing the tension-free, permanent shaping of the filter material which is necessary for the elongated ribs. For the production of the line-shaped free areas of the filter material, which are free of irregularities and are intended for shaping the filter pleat wall edges, at least one heater jaw is provided, which is effective only in these areas. This apparatus is simple and economically advantageous.

It is possible for the shaping device to include two jaws, which are thermally insulated from each other in the longitudinal direction, between which the filter material is first guided in the direction of movement. The jaws are initially at a temperature which is below the shrinking temperature and above the deformation temperature, and subsequently the jaws are at a temperature below the deformation temperature. To produce a filter insert with elongated ribs extending obliquely to the longitudinal direction of the tape-like filter material, it is possible to provide a shaping device with jaws, which are divided into interlocking oblique grooves and oblique ribs, which extend crosswise to the longitudinal direction of the filter material, and whereby the jaws move transversely to the longitudinal direction of the tape-like filter material at a speed corresponding to the lateral displacement speed of the oblique ribs.

In an embodiment of the invention, at least one transport gripper is provided, which performs a step-like advance of the tape-like filter material, which corresponds to at least the distance between two pleat wall edges of the filter insert. In the course of this step-like advance, it is possible to use the heater jaw, which is intended for the shaping of filter edges, simply by lowering and subsequent lifting of the jaw. The apparatus may have at least three jaws, which are trapezoidal in cross-section, and are closable in the longitudinal direction of the elongated ribs which are provided in the pleat walls. These jaws are alternately oriented with their points or narrow ends facing in the opposite directions. At least one heater jaw cooperates with the narrow ends of each of the trapezoidal jaws, which are located between the two outer jaws and heat the filter material to a temperature which is between the shrinking temperature and the melting temperature. The oblique sides of the jaws, which are trapezoidal in cross-section, may include an angle between 50° and 70°.

BRIEF DESCRIPTION OF THE DRAWINGS

The invention is further explained in the description which follows with reference to the drawings illustrating by way of non-limiting examples, various embodiments of the invention wherein.

DETAILED DESCRIPTION OF THE PREFERRED EMBODIMENTS

Figure 1:
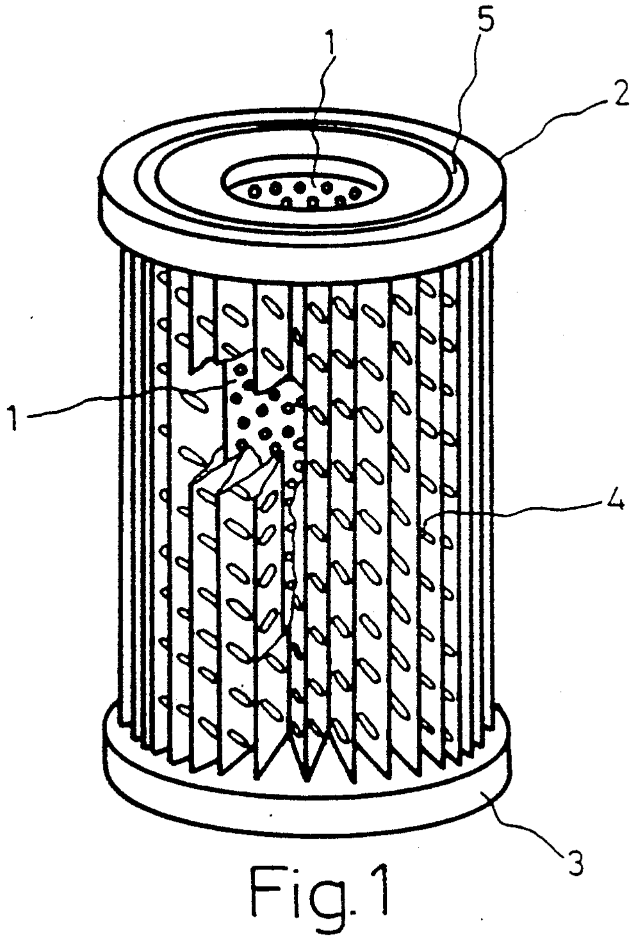
FIG. 1 is a filtering device provided with a filter insert made in accordance with the present invention.

The filtering device, which is shown in partial section in FIG. 1, includes a pipe 1 which is provided with holes, two flanges 2, 3 fixed on pipe 1, and pleated filter insert 4 which is inserted between the two flanges 2, 3. Flange 2 is provided with groove 5 adapted to receive a sealing ring. For the sake of improved clarity, the filtering device is shown without a housing or connecting devices in FIG. 1. The gaseous or liquid medium to be filtered is supplied through the housing, not shown, from the exterior and radially to the inflow side of the filter inset. Pipe 1 includes holes which adjoins the outflow side of filter insert 4. The filtered medium is drawn off axially from pipe 1 through a connecting piece, not shown.

Figure 2:
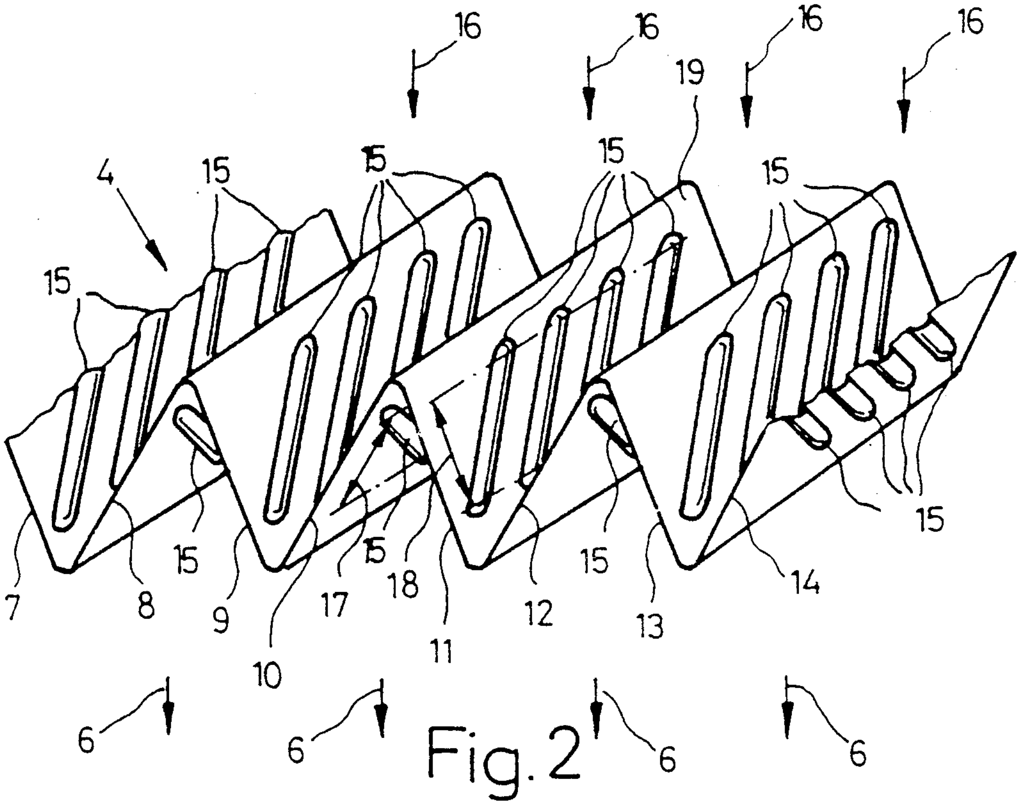
FIG. 2 is a perspective view of a section of a pleated filter insert.

The pleated filter insert includes a thermoplastic filter material. Such filter materials are commercially available and are produced from known thermoplastic materials, such as polyethylene, polypropylene, polyester, polyamide, polytetrafluorethylene, for example, FIG. 2 shows an enlarged section of the pleated filter insert 4, which is shown in FIG. 1. In FIG. 2, it is possible to see particularly clearly that in the filter pleats which open towards the outflow side, as indicated by the arrows 6, the pleat walls 7 to 14 are separated or spaced by elongated ribs 15, when the filter pleats are pressed together. Ribs 15 are shaped from the filter material itself and extend from the outflow side of the filter pleats. The longitudinal orientation of ribs 15 is at an angle of approximately 70° with respect to the longitudinal orientation of pleat walls 7 to 14. By means of the oblique placement of ribs 15 with respect to the longitudinal orientation of the pleat walls 7 to 14, ribs 15 cross within the filter pleats on the outflow side and are only in contact with each other at the crossing points. Therefore, the filter material in all pleat walls 7 to 14 is available for filtering without a substantial loss of surface. The filter pleats on the inflow side of the filtering device shown in FIG. 1 are maintained open or spaced apart because of the circular configuration of the filter insert. If the filter pleats were disposed behind each other in substantially parallel planes, it would be possible to provide ribs extending from both sides of the filter material. In FIG. 2, the inflow side of filter insert 4 is indicated by arrows 16.

The filter material intended for filter insert 4 is prepared by the following process. In order not to twist or warp the filter material during the process and subsequent shaping of the elongated ribs, and to prevent a change in the structure of the filter material, the tape-like filter material, which is transported in the longitudinal direction, is narrowed transversely to the longitudinal direction by the amount of material required for the elongated ribs by gathering the material evenly across the entire width in a first process step. The elongated ribs are then formed by tension-free, permanent shaping of the filter material between the jaws of a shaping device. In the course of the process, the filter material to be shaped is heated to a temperature which is between the shrinking temperature and the deformation temperature of the filter material. After shaping has been performed, the filter material is cooled below the deformation temperature. The line-shaped areas of the filter material, which are intended for the formation of pleat edges are heated by at least one heater jaw to a temperature, which is between the shrinking temperature and the melting temperature until the irregularities caused by the elongated ribs and/or by the gathering of the filter material are smoothed out by shaping of the material. Subsequently, the areas which are smoothed are cooled to a temperature below the deformation temperature. The filter insert 4, which is shaped in this manner from the filter material, has the original filtering properties on pleat walls 7 to 14, in spite of elongated ribs 15. This also facilitates cleaning and smoothing the pleat wall edges. In addition, the thermally treated, comparatively stiff pleat edges result in satisfactory stability of filter insert 4.

In the course of the thermal treatment by means of a heater jaw, the filter material permanently draws together at the line-shaped filter edges and becomes narrower than the width of the untreated filter material by the amount of the additional material required for the elongated ribs. The pleat edges, which are shortened in this manner, maintain the shape of the elongated ribs, even under the strongest operational flow and contamination of the medium to be filtered, and do not permit the stretching of the filter insert. In a further aspect of the process, prior to being brought to the jaws of the shaping device, the gathered filter material is heated to a temperature which is below the shrinking temperature and above the deformation temperature, and is subsequently placed between the jaws of the shaping device. The pre-heated filter material is more pliable than cold material and can be more easily placed between the jaws of the shaping device.

In accordance with a further aspect of the process, the gathered filter material may be first brought between two heated jaws and then between two cooled jaws of the shaping device. The heated jaws are at a temperature below the shrinking temperature and above the deformation temperature, which is generally between 60° C. and 140° C., depending on the filter material used. The cooled jaws are at a temperature which is below the deformation temperature. In the areas intended for the filter edges, the filter material, which is provided with longitudinal grooves after passing through these jaws, is heated at regular intervals to a temperature which is between the deformation temperature and the melting temperature, until the irregularities created by the longitudinal grooves have been smoothed out.

In a further aspect of the process, filter insert 4 can be produced in a single operation after the gathering of the filter material. Two successive pleat wall sections 17, 18 of the filter material, which are intended to receive longitudinal ribs 15, are maintained individually and tension-free between the jaws of a press. It is important that the filter material is not twisted or warped, so as not to change the filtering properties of the filter material. An intermediate area 19, containing irregularities between the pleat wall areas 17, 18, is held in the press. To smooth out the irregularities in the intermediate area 19, the intermediate area 19 is heated to a temperature which is between the deformation temperature and the melting temperature of the filter material. Intermediate area 19 is therefore permanently shaped, so that a smooth surface with no irregularities remains. In this same process step, the acutely angled pleat edge located between the pleat wall areas 7, 18 is shaped, because the jaws of the press maintain the successive pleat wall areas 17, 18 at an angle of approximately 45° during heating. In similar subsequent steps, all ribs 15, intermediate areas 19, and pleat edges of the entire filter insert 4 are formed into the desired shape. The jaws of the press and thus the pleat wall areas 17, 18 are heated during pressing to a temperature which is below the shrinking temperature, and above the deformation temperature of the filter material, so as to stabilize the shape of ribs 15. The filtering properties of the filter material are not impaired at this temperature, but the filter material undergoes permanent shaping. The deformation temperature, the shrinking temperature and the melting temperature can be determined from the information provided by the manufacturer of the filter material or by testing.

Figure 3:
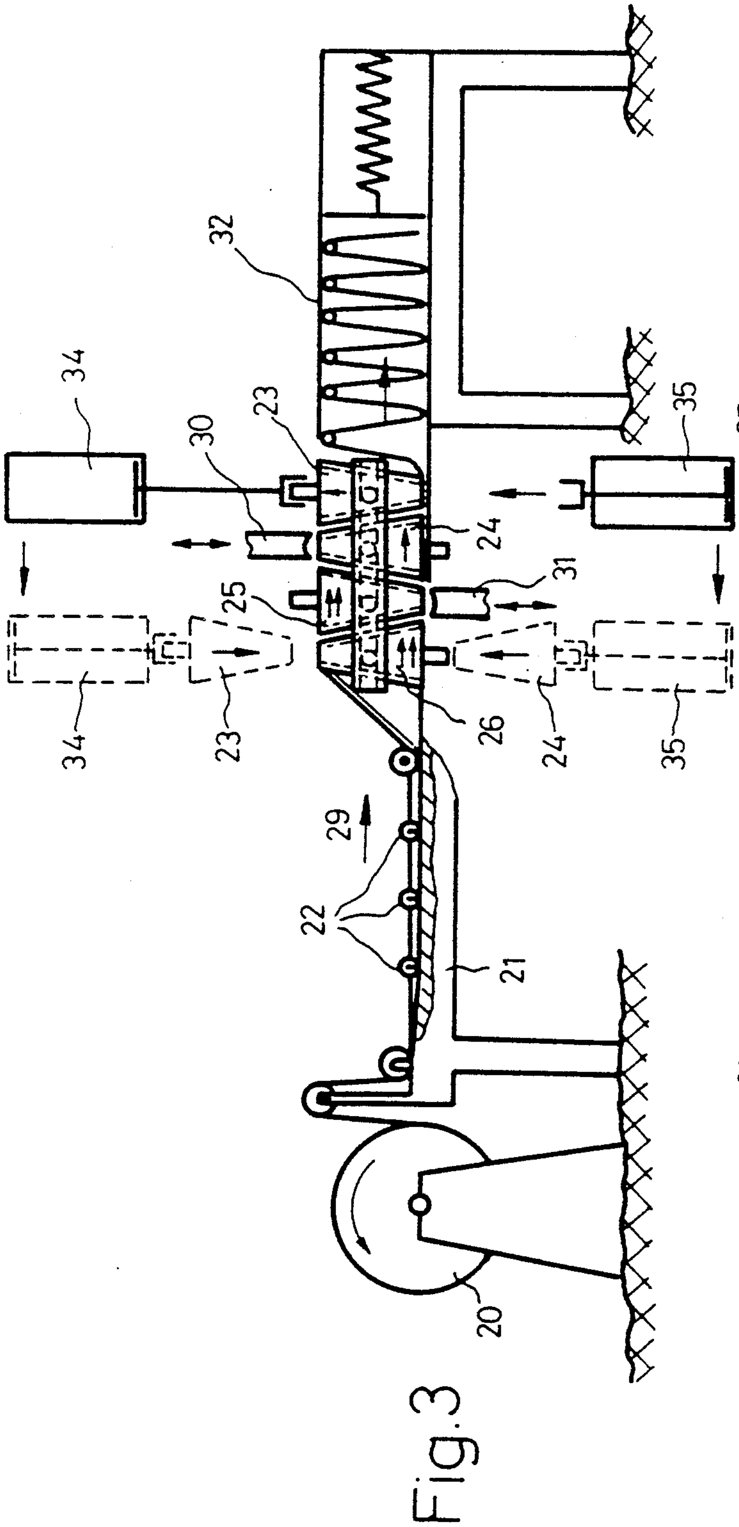
FIG. 3 is a schematic side elevation view of an apparatus for producing the pleated filter insert.
Figure 4:
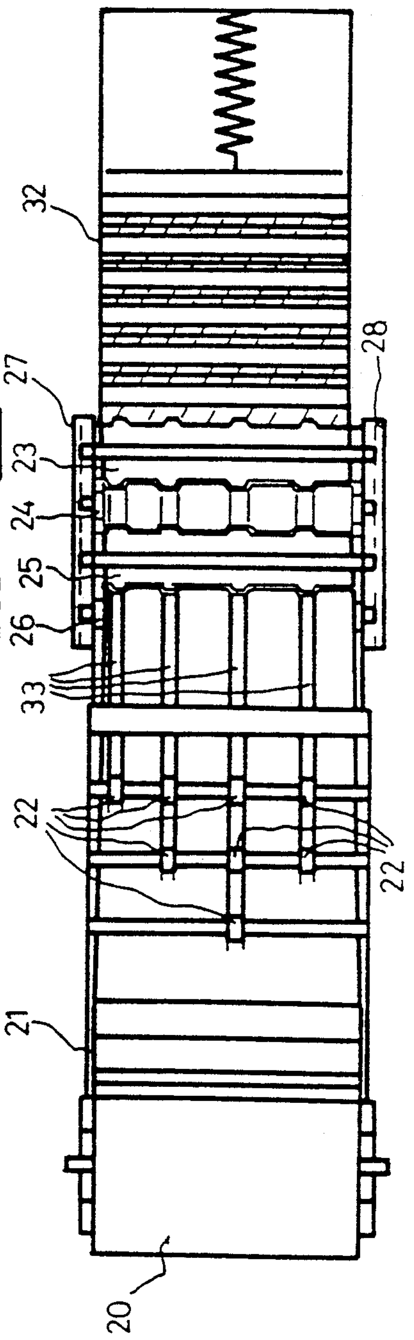
FIG. 4 is a plan view of the apparatus of FIG. 3.

An apparatus for executing the above-described process is schematically illustrated in a elevation and a plan view, respectively, in FIGS. 3 and 4. A table 21 is provided with longitudinal grooves (not shown) for preshaping the filter material 20, which supplied to the apparatus in the form of a web of material. Heated rollers 22 are associated with respective grooves and press filter material 20 into the grooves. The main process step takes place in a subsequent press. The press may include four heatable jaws, 23, 24, 25, 26, having a trapezoidal cross-section, between which the filter material 20 is clamped and maintained while forming elongated ribs 15. Jaws 23, 24, 25, 26 have been inserted into holders in the lateral guidance and drive elements 27, 28. The jaws can be displaced in the longitudinal direction 29 by a chain drive (not shown). Two heater jaws 30, 31 are provided to heat the filter material in the intermediate areas 19 between two pleat wall areas 17, 18 (shown in FIG. 2), to a temperature which is between the shrinking temperature and the melting temperature of the filter material. Heater jaws 30, 31 cooperate with the narrow ends of trapezoidal jaws 24, 25, which are located between the two outer jaws 23, 26. The completed, shaped filter insert is collected in magazine 32.

The apparatus shown in FIGS. 3 and 4 operates as described below. The filter material is supplied to table 21, which is provided with grooves, where heated rollers 22 form longitudinal grooves 33 in the filter material. The temperature of the rollers 22 is below the shrinking temperature of the filter material selected. The filter material which is transversely gathered in this manner is clamped between jaws 23, 24, 25, 26 of the press, which shape the elongated ribs 15. The jaws are provided with interlocking protrusions and indentations to form the ribs. Jaws 23, 24, 25, 26 are brought to a temperature which is below the shrinking temperature and above the deformation temperature of the filter material. To prevent twisting of the filter material during the closing of jaws 23, 24, 25, 26, the jaws close in succession in the longitudinal direction to form the elongated ribs 15 in the pleat walls 7 to 14. As soon as the filter material has been clamped between jaws 23, 24, 25, 26, heater jaws 30, 31 close and heat intermediate areas 19 (shown in FIG. 2) to a temperature which is above the shrinking temperature and below the melting temperature of the filter material. Heater jaws 30, 31 can either act on spots of protruding filter material portions or on lines along the entire length of intermediate areas 19.

A known, commercially available heating device, such as ultrasound or infrared heating, may be used for heating heater jaws 30, 31. At the temperature mentioned above, the filter material contracts with respect to heater jaws 30, 31. After removal of heater jaws 30, 31, the filter material in intermediate areas 19, which form the pleat edges, is smooth and comparatively stiff. The smooth pleat edges can therefore be easily cleaned. The stiffness of the pleat edges also gives satisfactory stability to filter insert 4. At the end of the step just described, front jaw 23 is lifted from the holders of the drive elements 27, 28 by a gripping and lifting device 34 and the remaining jaws 24, 25, 26 are pushed forward, towards the right in FIG. 3. The gripping and lifting device 34 and jaw 23 suspended from it are now displaced backward, to the left in FIG. 3. Then jaw 23 is inserted into the holders of drive elements 27, 28 in the gap, left by the now displaced jaw 26. Then, gripping and lifting device 34 returns to its rest position. Jaw 24 now is in the first position (the farthest to the right in FIG. 3). A second gripping and lifting device 35 now lifts jaw 24 out of the row of jaws 25, 26, 23. After jaw 24, which now is first, has been pulled out, the remaining three jaws 25, 26, 23 are pushed forward. Then gripping and lifting device 35 with jaw 24 suspended from it is pushed back and jaw 24 is inserted at the last place, behind the jaw 23, into the holders of drive elements 27, 28. Now the second gripping and lifting device 35 also returns into its rest position. Following these movements of the jaws, fresh filter material having irregularities is located opposite heater jaws 30, 31, because the filter material has been drawn off the roll of material by the displacement of jaws 25, 26 23, 24. The pleat wall areas 17, 18, with the elongated ribs 15, are clamped between jaws 25, 26, 23, 24 of the press. Heater jaws 30, 31 now close again and bring the filter material lying opposite them to a temperature between the shrinking temperature and the melting temperature of the filter material. In subsequent, repeated steps, after each removal of heater jaws 30, 31, the first one of jaws 23, 24, 25, 26 in the row of jaws 23, 24, 25, 26 is always taken from the first to the last position and the remaining jaws 23, 24, 25, 26 in the row of jaws 23, 24, 25, 26 are pushed forward. The completed filter insert 4 is pushed into the magazine 32.

Figure 5:
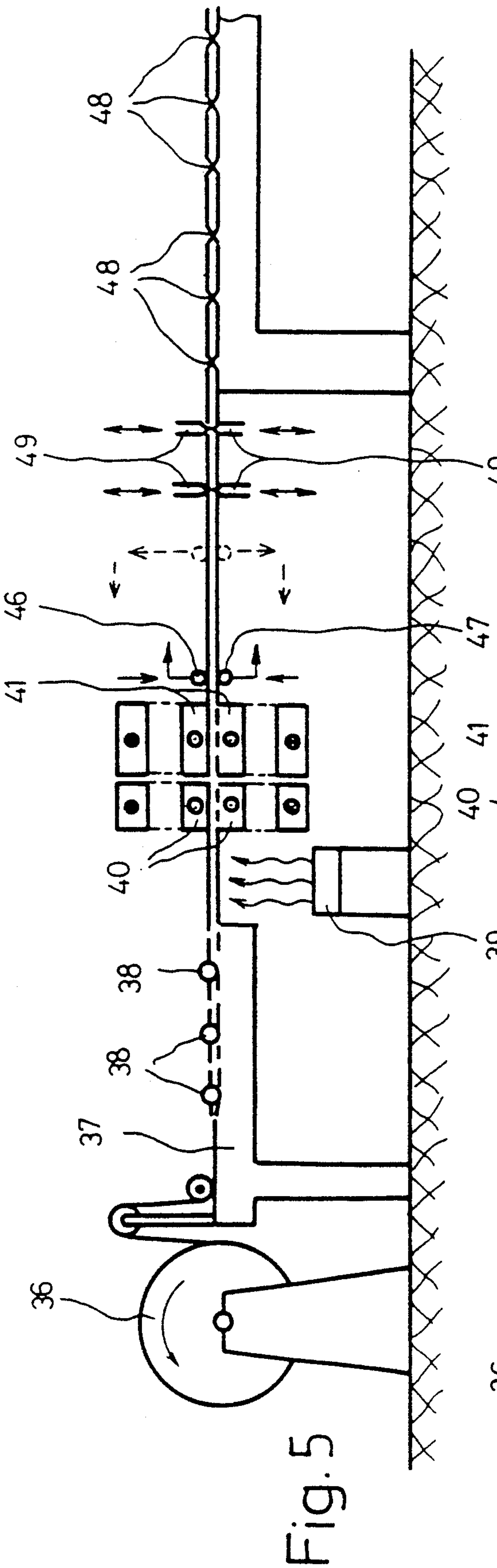
FIG. 5 is a schematic side elevation view of a further embodiment of an apparatus for producing the pleated filter insert.
Figure 6:
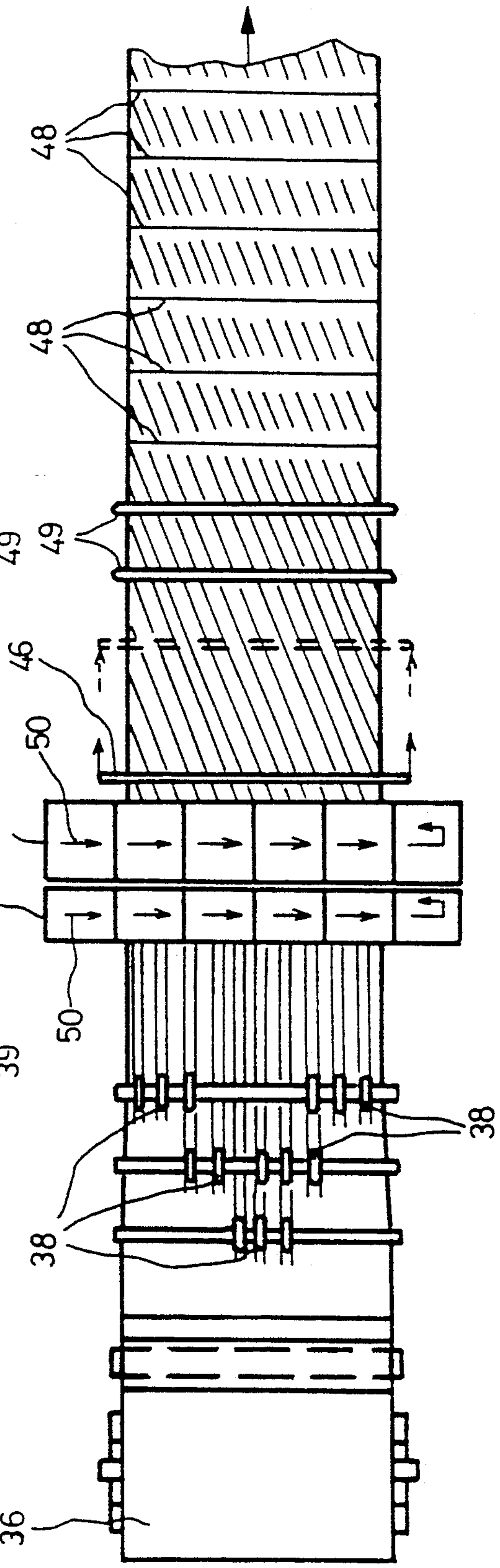
FIG. 6 is a plan view of the apparatus of FIG. 5.

A further embodiment of an apparatus provided for executing the described process is illustrated in FIGS. 5 to 8. FIG. 5 shows the apparatus schematically from the side and FIG. 6 from the top. The relationship of the various elements essential for the operation of the Apparatus is shown in FIGS. 5 to 8 schematically to improve the clarity of understanding this relationship. All guidance and activation elements have been omitted in FIGS. 4 to 8. Any commercially available suitable guidance and activation elements can be used for this purpose.

Figure 7:
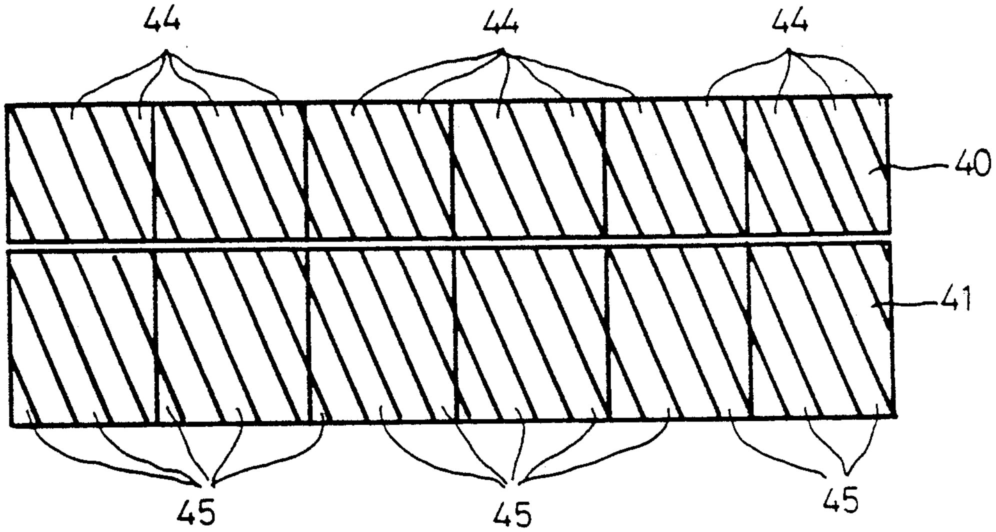
FIG. 7 is a plan view of the lower half of the jaws of the shaping device illustrated in FIGS. 5 and 6.
Figure 8:
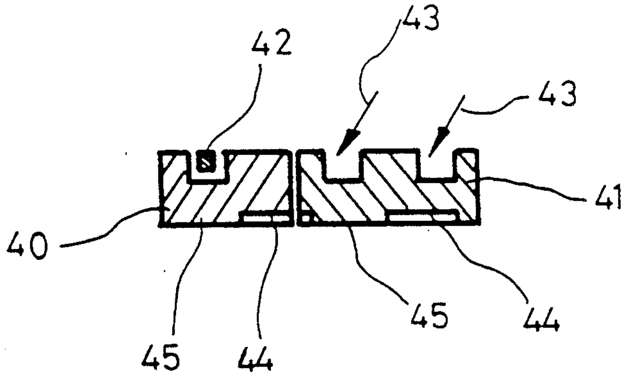
FIG. 8 a cross section of the upper jaws of the shaping device of FIGS. 5–7.

As shown in FIG. 5, the filter material has been unrolled. A plurality of rounded protrusions 38 are located on table 37, are staggered on both sides of the longitudinal centerline of the table and are interlocked from above and below in the manner of a comb. The protrusions may be formed by rollers located above the table and by longitudinal grooves (not shown) in the surface of table 37. Filter material 36 is brought between protrusions 38 and the grooves and is narrowed and gathered by protrusions 38 pressing filter material into the grooves. Following the table 37, heating device 39 is located under and focused on filter material 36. Then, the filter material is fed into the shaping device between two jaws 40, 41. Jaws 40 are heated to a temperature which is below the shrinking temperature and above the deformation temperature by means of heater rod 42 (schematically shown in FIG. 8). By means of an air flow indicated by arrows 43, jaws 41 are cooled to below the deformation temperature. FIG. 8 shows the upper half of jaws 40, 41 in cross section. FIG. 7 is a top view of the lower halves of jaws 40, 41 with the upper jaws removed. Jaws 40, 41 are each divided transversely to the longitudinal direction of the tape-like filter material 36 and are provided with oblique grooves 44 and oblique ribs 45. Oblique ribs 45 enter the oblique grooves of the opposite piece in the upper half of the jaws 40, 41, and vice versa. The individual parts of jaws 40, 41, respectively, are guided in such a way that they move with the oblique grooves of the filter material 36 transversely to the longitudinal direction of the filter material 36 and, after leaving the lateral edge of the filter material 36, are lifted or lowered out of the row and returned to the beginning of the moving parts of jaws 40, 41.

Two longitudinally movable pneumatic transport grippers 46, 47 are provided, which act in the manner of tongs, and incrementally transport the filter material 36 by twice the distance between two pleat edges 48 of the filter insert 4. Following transport grippers 46, 47 are four heater jaws 49, which can be raised and lowered. The closed heater jaws 49 touch filter material 36 to heat filter material 36 to a temperature which is between the deformation temperature and the melting temperature. The filter material is folded in a subsequent step. To prepare for folding, it is possible for the heater jaws 49 to press additional bending edges, which are alternately facing each other, into the areas of the filter material intended for the pleat edges. These bending edges are composed of alternate, oppositely directed grooves extending transversely to the longitudinal direction of the filter material.

The apparatus shown in FIGS. 5 to 8 operates as described below. The leading edge of filter material 36 is first inserted into the apparatus. Then heating device 39, heater rods 42 in the jaws 40, the air cooling for the jaws 41 and the control device (not described in detail and not shown) for the entire apparatus are switched on. As soon as the preset, desired temperatures have been reached everywhere in the apparatus, the control device switches the transport grippers 46, 47 on. The edges of the transport grippers 46, 47, which are cushioned with a soft material, grip the filter material 36 and pull it forward by twice the distance between two adjacent pleat edges 48 of filter insert 4. When the filter material 36 has reached this position, the four heater jaws 49 close and heat filter material 36 in two successive areas intended for the forming of pleat edges 48 to a temperature which is between the deformation temperature and the melting temperature until the irregularities, created by the elongated ribs and/or the gathering of the filter material, are smoothed out.

During this time, transport grippers 46, 47 move apart and return to the initial position. After completion of the smoothing of the irregularities, heater jaws 49 are removed from the filter material 36, after which filter material 36 cools to below the deformation temperature. If required, cooling can take place by means of forced air flow. Now the transport grippers 46, 47 again grasp the filter material 36 and the sequence of steps just described begins from the start. While the filter material 36 is being transported, jaws 40, 41 of the shaping device move transversely to the longitudinal direction of filter material 36 in the direction of the arrows 50 indicated in FIG. 6 with a speed corresponding to the lateral displacement speed of oblique grooves 44 and oblique ribs 45 of filter material 36. As soon as a separate part of the jaws 40, 41 has moved beyond the edge of the filter material, it is lifted from the row and returned to the beginning of the row of jaws 40, 41 by means of a return transfer device (not shown).

Although the invention has been described with reference to particular means, materials and embodiments, it is to be understood that the invention is not limited to the particulars disclosed and extends to all equivalents within the scope of the claims.

What is claimed is:

1. A process for manufacturing from filter material a pleated insert to be placed between inflow and outflow sides of a filter, said filter insert including a plurality of elongated ribs in at least filter pleat walls which are on an outflow side of the filter, said ribs being formed from the filter material and being adapted to space adjacent filter pleat walls from each other, the process comprising the steps of:

(a) transporting filter material having a shrinking temperature, a deformation temperature, and a melting temperature in a longitudinal direction;

(b) narrowing the filter material in a direction transverse to the longitudinal direction by the amount of material required for the elongated ribs;

(c) passing the filter material between jaws of a shaping device to form the elongated ribs;

(d) heating the filter material to a temperature which is between the shrinking temperature and deformation temperature of the filter material;

(e) heating the pleat wall edges by at least one heater jaw to a temperature between the deformation temperature and the melting temperature of the filter material to smooth out irregularities caused by at least one of the elongated ribs and the narrowing of the filter material; and (f) subsequently cooling the filter material to a temperature below the deformation temperature of the filter material;

whereby the elongated ribs are formed when the filter material is free of tension and the pleat wall edges are free of irregularities.

2. The process according to claim 1, wherein the filter material is heated to a temperature between the shrinking temperature and the deformation temperature prior to passing between the jaws of the shaping device.

3. The process according to claim 1, wherein the filter material is narrowed by gathering the filter material evenly across the entire width of the filter material.

4. The process according to claim 3, wherein the filter material is gathered by forming a plurality longitudinal grooves across the width of the filter material.

5. The process according to claim 1, wherein the narrowed filter material is first placed between first jaws of the shaping device and is heated to a temperature between the shrinking temperature and deformation temperature of the filter material, and then the filter material is placed between second jaws and cooled to below the deformation temperature.

6. The process according to claim 5, wherein the pleat wall edges are heated by said at least one heater jaw after the step of cooling the filter material to below the deformation temperature.

7. The process according to claim 1, wherein the filter material is held and heated between the jaws of the shaping device to a temperature between the shrinking temperature and the deformation temperature of the filter material, and wherein the pleat wall edges are heated by said at least one heater jaw while the filter material is held between the jaws of the shaping device.

8. The process according to claim 1, wherein successive pleat walls are maintained in the jaws of the shaping device at an acute angle with respect to each other to form a pleat wall edge.

9. The process according to claim 8, wherein the pleat wall edge is heated by said at least one heater jaw while the successive pleat walls are maintained in the jaws of the shaping device.

10. The process according to claim 1, wherein the step of forming the elongated ribs includes orienting ribs at an angle of 45° to 90° with respect to the longitudinal direction.

11. The process according to claim 10, wherein the elongated ribs of successive pleat walls are oriented so that a rib of one pleat wall crosses a respective rib of the successive wall.

12. The process according to claim 1, comprising forming the pleated insert from a thermoplastic material.

* * * * *